Feb. 2, 1943.  E. H. KRUSE  2,310,030
BOBBER FOR FISH LINES
Filed July 12, 1941
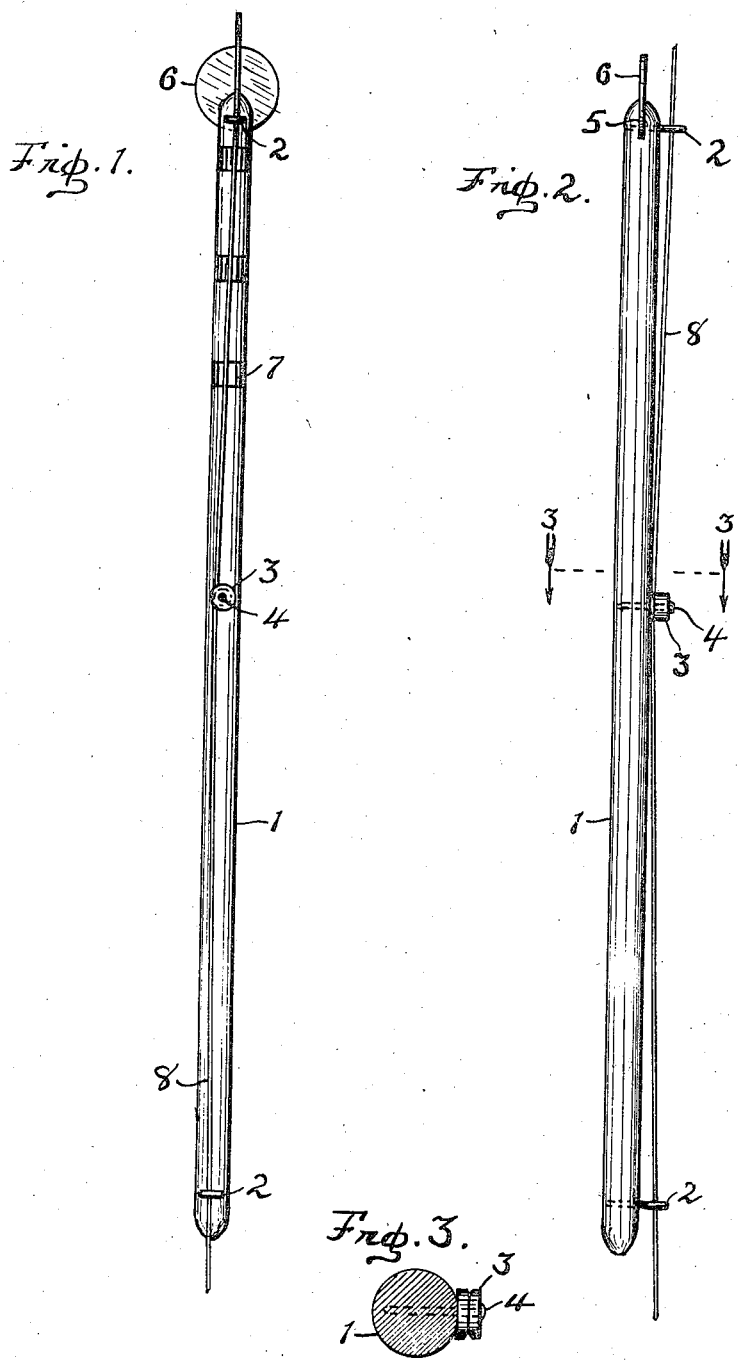
Edward H. Kruse INVENTOR.
BY
H. G. Burns ATTORNEY.

Patented Feb. 2, 1943

2,310,030

UNITED STATES PATENT OFFICE 2,310,030

BOBBER FOR FISH LINES

Edward H. Kruse, Fort Wayne, Ind.

Application July 12, 1941, Serial No. 402,159

4 Claims. (Cl. 43—49)

This invention relates to improvements in bobbers for fish-lines.

Numerous bobbers previously have been devised for attachment at one end to a line so as to swing freely about. Such types of bobbers especially in rough weather frequently become entangled in the line and require rearrangement in order to operate properly. Also, other types of bobbers have been provided with devices by which the line is adjustably secured or attached to the stem of a float in such manner that adjustment of the bobber to different positions on the line is more or less difficult and uncertain. In the present invention, stringing of the line through the line guides on the float and connecting the line to the fastener at desired points on the line is effected expeditiously by very simple manipulation, and this is an outstanding feature of the instant invention.

An object of this invention is to provide a bobber constituted of an elongated float, means for attachment of a line adjustably to the float, and an indicator displayed on one end of the float so as to be exposed to view above the water.

Another object of the invention is to provide line guides in connection with a float located at each end thereof, and an intermediate fastener on the float for engagement with a fish line strung through said guides by which the float is adjustably secured to the line in selected positions thereon suitably for fishing in various depths of water.

And a further object of the invention is to so construct a fishing bobber having a float, line guides, and a fastener arranged in connection therewith that is adjustably secured upon a fish line in such manner that entanglement of the line about the float is circumvented.

Other objects and advantages of the invention appear in the following description.

An illustrative embodiment of the invention is shown in the accompanying drawing, in which:

Fig. 1 is an elevational view of a bobber in which the invention is incorporated;

Fig. 2 is another elevational view of the structure shown in Fig. 1 in a vertical plane at right angles thereto; and Fig. 3 is a cross-sectional view of Fig. 2, drawn to an increased scale, the section being on the line 3—3.

The illustrative embodiment of the invention consists of an elongated float 1 in the form of a rod, the ends of which are tapered bluntly, and preferably made of wood or other suitable material that is buoyant in water. In one side of the float, closely adjacent its tapered ends, are positioned outwardly projecting line guides 2. These guides consist of screw-eyes the stems of which extend into the float for support. On the same side of the float located at a point thereon intermediately with respect to the guides, is secured a fastener consisting of resilient disks 3 mounted upon a stem 4 that extends axially through the disks into the float so the inner end of one disk is compressed yieldingly against the adjacent face of the float.

In the upper end of the float there is made a slot 5 in the plane of the axis thereof in which is positioned an indicator consisting preferably of a thin flat disk 6 made of light-reflecting material, such as Celluloid or polished metal. The disk is held in place by the stem of the adjacent screw-eye 2 which extends transversely through the float and disk. The visibility of the indicator may be augmented by using material that is brightly colored. Upon the upper end portion of the float are applied a series of bands 7 of contrasting colors which renders the upper end of the bobber conspicuous and readily discernible while the bobber is erect in the water.

Operation

In using the bobber a fish line 8 is strung straight through the line guides 2, and a sinker and fish hook are attached to the lower end of the line, and the opposite end thereof is secured to a pole in the ordinary manner, the sinker, hook and pole not being shown. The bobber then is moved along the line to a point suitably distant from the sinker according to the depth of the water at the location where fishing is to be undertaken. The line between the guides is then wound a single turn around the stem 4 between the resilient disk and the float, or between the disks, and then drawn taut. The compression of the disk against the coil of the line around the stem toward the float firmly holds the line from relative movement with respect to the float. To change the position of the float on the line it is only necessary to uncoil the line from the fastener, shift the float to the desired new position and again secure it to the fastener in the same manner as in the first instance. Upon casting the bait into the water, the bobber assumes a vertical position because of the weight of the sinker and then the indicator and upper portion of the float is exposed to view above the surface of the water.

As the fastener is located medially on the float a substantial distance from each guide, and as the line has free-running movement through both guides, appreciable convenience is afforded when making readjustments of the bobber to new positions on the line. For instance: To move the bobber higher, the line is grasped at a point between the upper guide and the fastener, drawn down through the upper guide to any desired extent, detached from the fastener and the slack in the line is then drawn down through the lower guide, after which the line is again secured on the fastener. In lowering the bobber, the line is grasped at a point between the lower guide and the fastener, drawn up through the lower guide to the desired extent, detached from the fastener and the slack is drawn up through the upper guide, after which the line is again secured on the fastener. By these simple operations the fisherman is enabled to accurately determine the extent of each adjustment while it is being made.

A valuable feature of the invention is the particular arrangement of the line guides adjacent the ends of the float which preferably is elongated and of uniform diameter substantially throughout its length. The line guides extend outwardly from one side of the float and are disposed so their eye openings are axially alined upon a common axis which is parallel with that of the float. By this arrangement a line strung therethrough, when not secured by the fastener, is permitted to run freely through the guides so that when casting the bait, the bobber then is disposed adjacent the baited end of the line with the lower guide stopped against the sinker or other obstruction, such as a knot (not shown) made in the line at a suitable point above the sinker wherefore to limit downward movement of the bobber on the line.

After the bobber has alighted in the water it assumes an upright position with the indicator exposed due to the weight of the sinker, and the line is drawn freely down through the guides as the sinker descends in the water to any desired depth while the bobber remains buoyant at the surface. By making a bow-knot or placing any suitable obstruction (not shown) on the line at any desired point thereon above the bobber, such as cannot pass through the upper guide, downward travel of the line relative to the bobber is thereby limited. Thus, the bobber has free play on the line and shuttles between the bow-knot and the sinker. In this manner the bobber automatically assumes a position near the lower end of the line when the bait is pulled from the water, and in that position greatly facilitates recasting of the bait and also circumvents entanglement or fouling of the bobber with the line either during casting or when withdrawing the bait from the water. The bait automatically re-assumes its position in the water at a depth limited by contact of the bow-knot with the upper guide. As the top line guide 2 is disposed to one side of the float and the flat faces of the indicator extend in vertical planes at right angles to the axis of the stem of the guide, the float turns easily upon its axis by a slight pull of the line by the fisherman so the indicator is exposed flatwise to view and thus becomes conspicuous even at a considerable distance.

Variations from the particular construction above disclosed may be resorted to by the exercise of skill in the art without departure from the spirit or scope of the invention, and the following claims are intended to be inclusive of such variations.

What I claim is:

1. A bobber for fishing consisting of an elongated thin float of substantially uniform diameter throughout its length, line guides secured to the float one adjacent each end thereof provided with guide openings that are alined with each other, a line fastener located on the float between said guides, and an indicator consisting of a thin flat disk disposed on the top of said float in a vertical plane transversely with respect to the stem of the adjacent guide.

2. A bobber for fishing consisting of an elongated thin float of substantially uniform diameter throughout its length, line guides secured to the float one adjacent each end thereof provided with guide openings that are alined with each other, and an indicator consisting of a thin flat disk disposed on the top of said float in a vertical plane transversely with respect to the stem of the adjacent guide.

3. A bobber for fishing consisting of an elongated float provided with a laterally extending line guide adjacent each end thereof, the guide openings in said guides being alined with each other, and an indicator consisting of a thin flat disk secured to the upper end of the float in a vertical plane that is transverse with respect to the horizontal axis of the adjacent guide.

4. A fishing bobber consisting of an elongated float provided at one end with a vertical slot, an indicator consisting of a thin flat disk positioned in said slot, a line guide member having a stem that extends transversely through said float and said disk so that the flat faces of said indicator are held in a vertical plane transversely with respect to the stem of said guide member, and another line guide for the lower end of said float.

EDWARD H. KRUSE.